United States Patent [19]
Stumpf

[11] Patent Number: 6,131,892
[45] Date of Patent: Oct. 17, 2000

[54] BELTED POCKETED SPRINGS AND ASSEMBLIES THEREOF

[75] Inventor: Walter Stumpf, Dunwoody, Ga.

[73] Assignee: Sidhil Technology, LLC, Norcross, Ga.

[21] Appl. No.: 09/348,221

[22] Filed: Jul. 6, 1999

[51] Int. Cl.[7] ............................. F16F 13/04; A47C 27/04
[52] U.S. Cl. ............................. 267/91; 267/89; 5/655.8; 5/727
[58] Field of Search .......................... 5/655.8, 720, 727; 267/91, 94, 89, 97, 93, 80, 81; 29/91.1; 53/114

[56] References Cited

U.S. PATENT DOCUMENTS

| | | |
|---|---|---|
| 685,160 | 10/1901 | Marshall . |
| 1,192,510 | 7/1916 | Fischmann . |
| 1,226,219 | 5/1917 | Karpen . |
| 2,540,441 | 2/1951 | Gordon . |
| 3,251,078 | 5/1966 | Calla . |
| 4,234,984 | 11/1980 | Stumpf . |
| 4,523,344 | 6/1985 | Stumpf et al. . |
| 4,854,023 | 8/1989 | Stumpf . |
| 4,906,309 | 3/1990 | Breckle . |
| 4,986,518 | 1/1991 | Stumpf ................................ 267/91 |
| 5,613,287 | 3/1997 | St. Clair .............................. 29/91.1 |
| 5,749,133 | 5/1998 | Mauldin et al. .................... 29/91.1 |

Primary Examiner—Alexander Grosz
Attorney, Agent, or Firm—Fitch, Even, Tabin & Flannery

[57] ABSTRACT

Disclosed are pocketed upholstery springs in strip form characterized by placement of the closing seam midway between the ends of the springs of the strip, with the marginal flaps of the pocket strip fabric outwardly of the closing seam folded over as a two-ply belt and incorporated into the cross seams which define the pockets about the springs. Adjacent rows of such strips are joined together by tacking through their respective belts at the cross seams to form two-row modules for ease of mattress/cushion assembly, or to form full-size mattress/cushion constructions by joining row upon row.

14 Claims, 3 Drawing Sheets

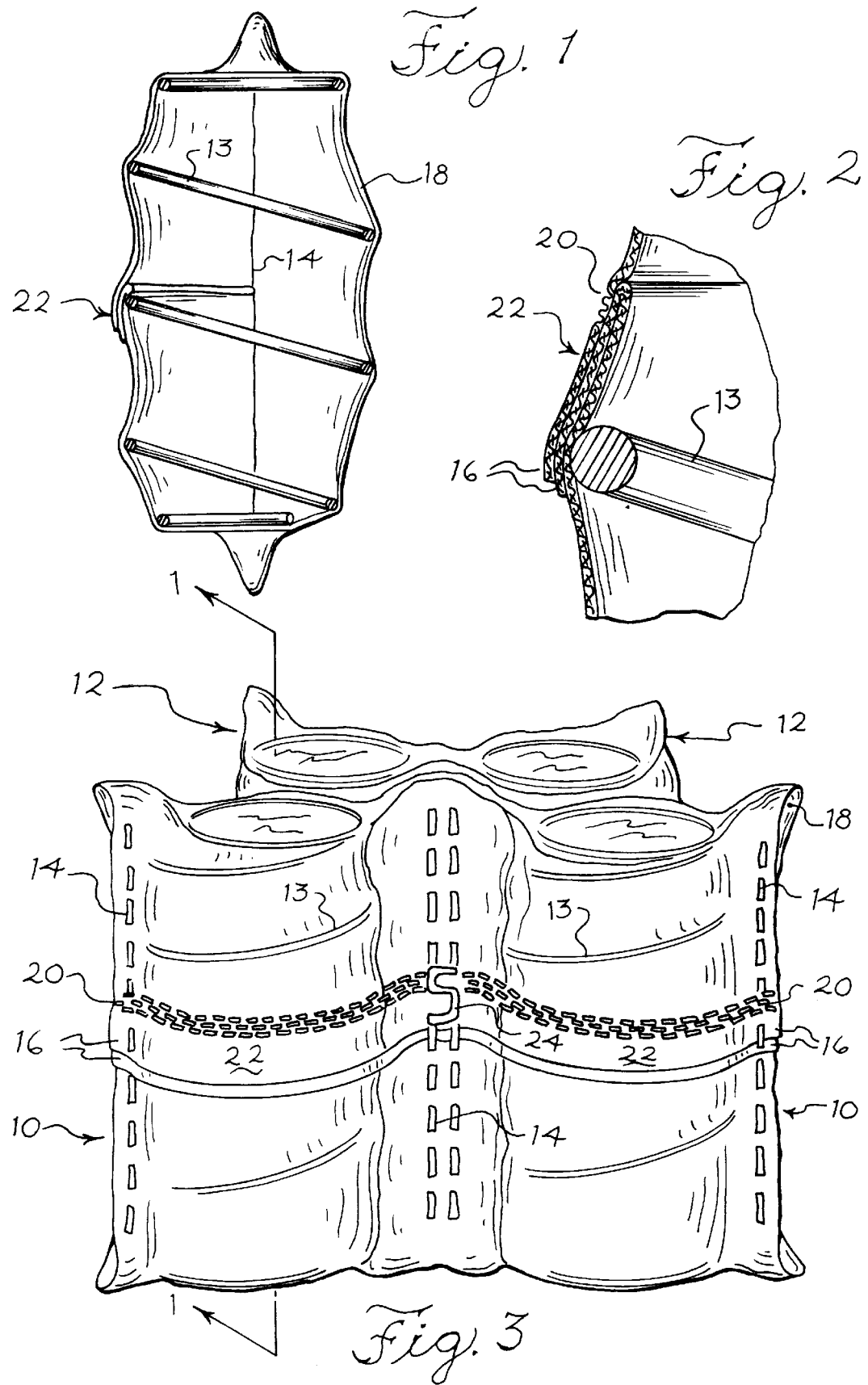

BELTED POCKETED SPRINGS AND ASSEMBLIES THEREOF

This invention relates to pocketed springs and to assemblies thereof for use in mattresses and cushions.

BACKGROUND OF THE INVENTION

Pocketed springs for use in upholstery have been known for many years, dating at least from early in the twentieth century. Assemblies of such springs as cores for mattresses or cushions are known in the industry as "Marshall" constructions or units, for the man believed to have originated the concept. See U.S. Pat. NO. 685,160 of 1901.

Machinery developed for the commercial manufacture of such units inserted axially compressed springs between the plies of a strip of sheeting folded in half longitudinally, and then seamed the folded strip along its edges, and transversely between the springs, to form pockets each enclosing a single spring. After re-expansion, the springs were turned in their pockets, resulting in a continuous strip of axially parallel springs with the marginal flaps of the edge seams of the fabric strip located at the same one end of all of the springs. The sewn seam version is typified by U.S. Pat. No. 1,813,993 to John F. Gail, and the welded seam version of thermally weldable pocket sheeting by my prior U.S. Pat. No. 4,489,977.

When strips of such springs are assembled by the usual methods in rows in which the springs are axially parallel, the seamed edges of the fabric are found on the same face of the assembly, which some experts have concluded contributes an undesirably different feel to opposite sides of a mattress embodying such an assembly, due to the presence of the upstanding seam margins of the fabric strip on the outside of the closing seam of the fabric. While the validity of that proposition may smack of the fairy tale of the princess and the pea, it has sufficiently engaged the interest of bedding manufacturers to promote the development of pocketed springs in strips in which the closure of the longitudinally folded fabric strip occurs along one side of the strip of pocketed springs rather than at the ends thereof. One example is provided by my U.S. Pat. Nos. 4,854,023 and 4,986,518, to which subsequent improvements are suggested by U.S. Pat. No. 5,613,287, St. Clair et al., and U.S. Pat. No. 5,749,133, Mauldin et al.

The reality, however, is that that approach, for whatever reason, failed to supplant the widely used spring-end closure seam that remains standard today.

BRIEF DESCRIPTION OF THE INVENTION

Taking a different approach to a side-seam closure for pocketed springs, I have developed a manufacturing method and apparatus which utilizes known methodology to the extent of inserting compressed springs between the plies of a longitudinally folded strip and making a longitudinal seam adjacent to the fabric edges, but withholding the transverse, pocket-defining seams until after the springs have expanded. In this arrangement, disclosed in my co-pending application for patent, Ser. No. 09/334,910, filed Jun. 17, 1999, the expansion of the spring transfers the closing seam from the end of the spring to approximately mid-height thereof where the seam margins are folded over and incorporated into the transverse seams on one side of the fabric strip when the pocket-defining cross seams are made between the springs. With the seam margins in that position, not only is the possibility of differential face "feel" of a mattress eliminated, but the fabric margins outwardly of the closing seam, secured in folded-down contact with the outside of the fabric wall of the pocket, form a two-ply fabric belt along one side of the strip which facilitates and reinforces the connections of adjacent strips of springs to one another, whether in two-row modules or in more extensive assemblies of strip multiples.

The belted pocketed spring strip per se and its assemblies are the subject of this invention. The method and apparatus for manufacture of the strip are the subject of my co-pending U.S. patent application Ser. No. 09/334,910, filed Jun. 17, 1999.

DESCRIPTION OF THE DRAWINGS

This invention is hereinafter described in reference to the following drawings, in which:

FIG. 1 is a cross-section of a single pocketed spring of a strip thereof in accordance with the invention, taken transversely of such a strip with springs in line, as on the line 1—1 of FIG. 3;

FIG. 2 is a fragmentary enlargement of FIG. 1 to illustrate the two-ply belt formed by the folded margins of the strip outwardly of the closing seam;

FIG. 3 is a perspective view, looking slightly downward, of a four-spring fragment of a two-row pocketed spring module in accordance with the invention;

DETAILED DESCRIPTION OF PREFERRED EMBODIMENT AND UTILIZATION

Figure 4:
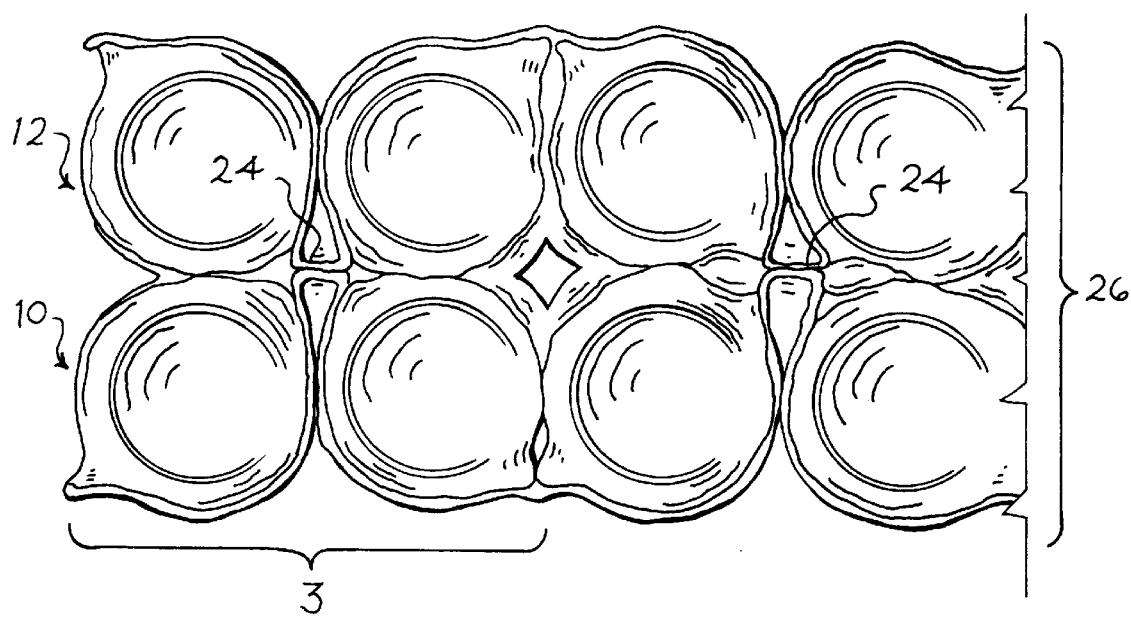
FIG. 4 is a fragmentary top (or bottom) view of a two-row pocketed spring module.

Referring initially to FIGS. 1 to 3, the latter shows the connection of two two-spring segments of two connected rows 10 and 12 of pocketed springs 13, positioned one row behind the other. The four springs shown in FIG. 3 correspond to either end group of four springs of FIG. 4, indicated by the bracket 3 of FIG. 4, severed from the adjoining springs of their respective rows. Furthermore, the two springs of the front-row 10 of FIG. 3 have been displaced sidewardly from their normal, unstressed four-spring cluster by bending them outwardly to illustrate more clearly the pocket-defining cross-seam 14, the two springs 12 of the rear row being crammed together in the process.

Focusing upon the front row 10 of springs in FIG. 3, the marginal flaps 16 of the two plies of the folded strip of fabric 18 outwardly of the longitudinal seam 20 which formed the plies into a tube or sleeve, are folded downwardly from the seam 20, and incorporated into the cross-seams 14 of the fabric sleeve which defined the successive pockets about the individual springs. When made by the method and with the apparatus of my co-pending application Ser. No. 09/334,910, the cross-seams 14 are made after the springs, compressed for insertion between the fabric plies before the longitudinal seam is made, have been permitted to expand within the fabric sleeve.

The fabric flaps 16 outwardly of the closing seam 20 thus become a two-ply belt 22 of the pocket fabric running along each row or strip of pocketed springs approximately midway between the ends of the springs.

Further in accordance with the invention, the belt 22 becomes the location at which two adjacent rows of such pocketed springs are attached to one another at midheight of the two rows 10 and 12, preferably by a single tack 24, whether by tack stitch, staple, or adhesive, but preferably by a tack or button weld in pocket material of thermoplastic fiber such as the Duon material of Phillips Fibers, or a material having a sufficient thermoplastic content for effective thermal welding by ultrasonic means. In FIG. 3, the tack weld 24 is made in the shape of a stylized letter "S".

Figure 5:
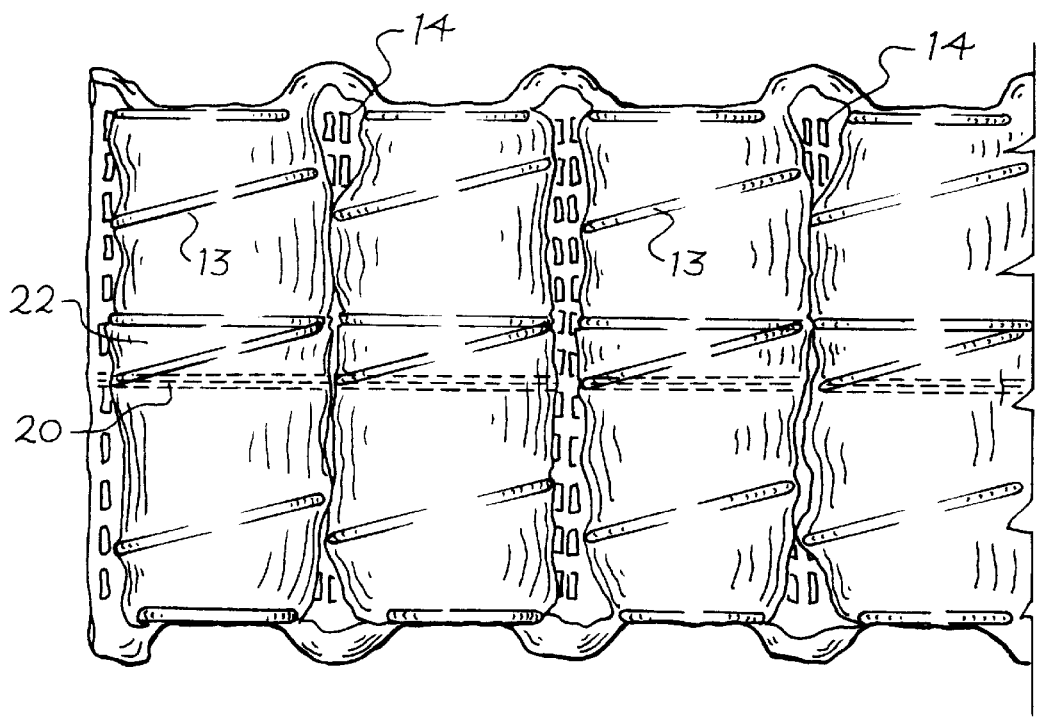
FIG. 5 is an elevational view of the same.

In FIGS. 3, 4, and 5, the belts 22 of the pocketed springs are placed on the outsides of the two back-to-back spring rows 10 and 12, but it will be understood that two-row modules may also be made in the same fashion with the belts of the two rows in touching contact, i.e., with the belt concealed within the two-row module, or, indeed, with the belt of each row on the same one side of each row, as when multiple rows are successively united in single row increments. In each instance, the connection 24, whether by stitch, etc., or by weld, unites eight layers of the pocket fabric in an extremely strong and durable joint.

The two-row module 26 (FIG. 4) is preferred for its versatility as a unit of mattress core assembly and for its relative ease of manufacture. It is very stable, whether stood on either face, and will not tip or topple, or turn over when in service as part of a mattress core. It is easily grasped in one hand by the assembler, and lends itself well to the creation of mattress cores which vary in firmness by zones from head to foot of the mattress for the better support of the human body in repose.

The two-row module has the further advantage of relative ease of manufacture, particularly when the pocket sheeting is thermally weldable, using equipment that is fairly simple and need not represent heavy capital investment.

Multiple-row modules or units i.n excess of two rows can, of course, be made readily on equipment such as that of my earlier U.S. Pat. No. 4,401,501, issued August 30, 1983, but such equipment is more capital intensive than the simpler apparatus envisioned for inserting an ultrasonic probe and opposing probe-anvil between the springs of two rows of pocketed coils advancing side by side through a welding station to be joined at the hip, so to speak, by a tack or spot weld through the belts of the rows.

Figure 6:
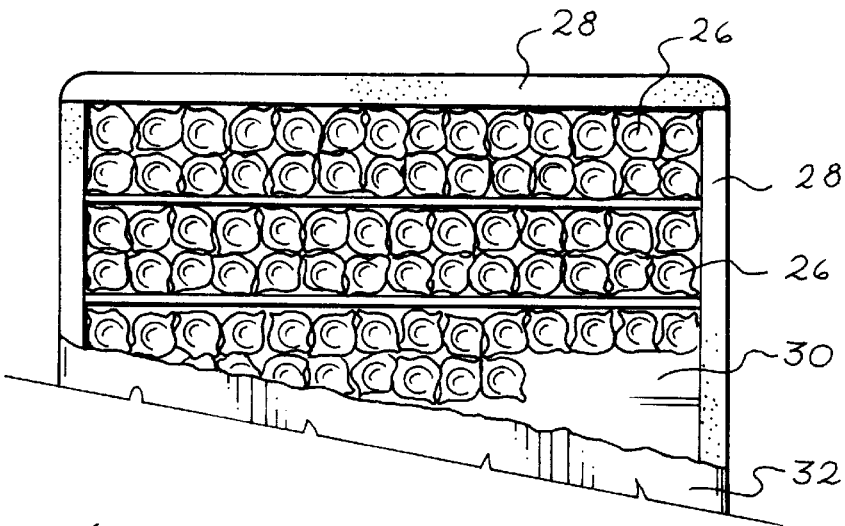
FIG. 6 is a plan view of the interior of a mattress construction illustrating one manner of using the inherently stable two-row module in a polyfoam box.
Figure 7:
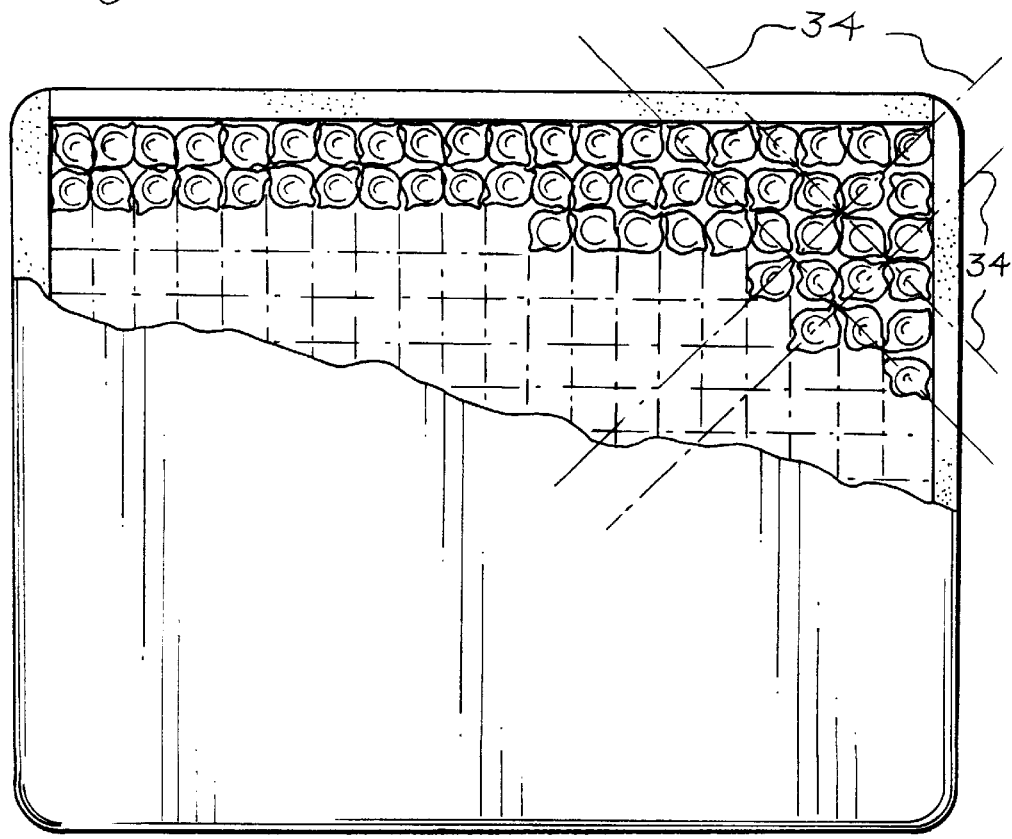
FIG. 7 is a plan view of another of a pocketed spring assembly, either of two-row modules in touching contact within a polyfoam border, or of a unitary, multiple row assembly joined as single-row increments.

Assembled mattress cores using the belted pocketed springs of the invention are depicted in FIGS. 6 and 7.

In FIG. 6, I illustrate a form of assembly in which two-row modules 26 are placed transversely of the mattress within a surrounding border frame 28 of "polyfoam" (e.g., foamed polyurethane), on a base sheet 30 of the foamed material, with the two-row modules in touching contact. In the illustrated case, the belts of the spring strips are on the outside of the two-row module, as indicated by double-lines where the modules contact each other. The mattress core is completed by a covering sheet 32 of the foamed material secured by adhesive to the polyfoam border frame to facilitate further handling of the assembled core during manufacture, e.g., for application of a ticking cover, and, where desired, for tufting.

The construction of pocketed spring assemblies from modules of two rows can have other advantages as well, for example, a head-to-foot orientation of mattress-length modules for the sake of mattress halves of different firmness, to suit the different preferences of husband and wife. The more likely application is expected to be transverse orientation of modules of mattress-width length to facilitate the provision of variable firmness to accommodate the weight distribution of the human body in repose.

FIG. 7 may be taken to illustrate an integral multiple-row assembly constructed one row at a time, with the inter-row connections of consecutive rows displaced sidewardly by one spring from row to row, as illustrated by the crossed diagonals 34. It is equally adaptable to the zonal firmness variations attributed to mattress assemblies of two-row modules, and may be boxed in polyfoam as depicted for the modular assembly of FIG. 6.

For the convenient severance of the pocketed spring strips into individual rows or two-row modules, the interpocket cross seam 14 is preferably made in two rows of individual spot welds spaced adequately between the rows for a severance cut without either sacrificing a spring or compromising the adjacent pockets. See FIG. 3.

A significant aspect of the invention wholly apart from its successful elimination of the differential "feel" of opposite sides of a pocketed coil mattress, is the outer belt of the strip of pocketed springs which greatly enhances the strength to the inter-row connections, whether made by spot welding through both belts to merge eight layers of the pocket material in a fusion of exceptional strength, or by other forms of attachment which unite the two belts.

The features of the invention believed new and patentable are set forth in the following claims.

What is claimed is:

1. A strip of connected springs in axially parallel alignment in a sleeve formed by longitudinally seaming a longitudinally folded two-ply strip of sheeting inwardly of and adjacent to its edges and cross-seaming said sleeve to form springs with its axis disposed transversely of said sleeve;

said longitudinal seaming being positioned approximately midway between the ends of the springs along one side of said strip and providing longitudinal edge flaps folded into contact with the outer surface of each pocket and incorporated into each cross-seam of the sleeve.

2. The strip of claim 1 wherein said edge flaps overlie one another as a two-ply belt along one side of said strip.

3. The strip of claim 2 wherein said sheeting is thermally weldable, and the seaming thereof is thermal welding.

4. The strip of claim 3 in which the cross-seaming between the pockets is a double row of spaced welds.

5. A pocketed spring unit for use in mattresses and the like comprising two parallel rows of belted strips of pocketed springs according to claim 2 in side-by-side relation with the spring of adjacent rows in parallel touching arrangement;

said rows being joined together by a connection of their cross-seams at two-spring intervals along said rows;

said connection being a tacking connection made through the belts of the two rows.

6. A pocketed spring unit for use in mattresses and the like comprising two parallel rows of belted strips of pocketed springs according to claim 3 in side-by-side relation with the springs of adjacent rows in parallel touching arrangement;

said rows being joined together by a welded connection of their cross seams at two-spring intervals along said rows;

said connection being made through the belts of the two rows and fusing all layers of the belts and sleeve in said connection.

7. The pocketed spring unit of claim 6 wherein each said welded connection is confined within the width of said belt.

8. The pocketed spring unit of claim 6 wherein the belts of the two rows are on the outsides of the two-row unit.

9. A pocketed spring assembly for mattresses and the like comprising a plurality of two-row units in accordance with claim 8, said units having uniform length arranged transversely of the assembly with the belts of adjacent units in touching contact, said touching belts comprising a buffer between units isolating the adjacent spring rows of adjacent units from mutual interference when deflecting under load.

10. The pocketed spring assembly of claim 9 wherein said two-row units are assembled in zones which vary in firmness from head to foot of the mattress with the variation of the weight of the human body in repose.

11. The pocketed spring unit of claim 6 wherein the belts of the two rows are in touching contact between the rows.

12. The pocketed spring unit of claim 6 wherein the belts of the two rows are positioned on the same one side of each row.

13. A pocketed spring assembly for mattresses and the like comprising multiple parallel rows of belted strips of pocketed springs according to claim 3 in side-by-side relation with the springs of adjacent rows in parallel touching array;

said rows being joined together by a welded connection of their cross seams at two-spring intervals of the springs of adjacent rows;

said connections being made through the belts of each two adjacent rows and fusing all layers of the belts and sleeve in said connections;

said connections being confined within the width of said belt, and the connections of each interior row of springs to its adjacent rows being staggered by one spring from row to row.

14. The pocketed spring assembly of claim 13 wherein the firmness of the springs of said rows differs by zones from head to foot of the mattress to accommodate the weight of the human body in repose.

* * * * *

UNITED STATES PATENT AND TRADEMARK OFFICE
CERTIFICATE OF CORRECTION

PATENT NO. : 6,131,892
DATED : October 17, 2000
INVENTOR(S) : Walter Stumpf

It is certified that error appears in the above-identified patent and that said Letters Patent is hereby corrected as shown below:

IN THE CLAIMS:

Column 4, line 33, after "form" insert --pockets therein, each said pocket individually encasing one of said--.

Column 4, line 50, change "spring" to --springs--.

Signed and Sealed this

Twenty-fourth Day of April, 2001

Attest:

NICHOLAS P. GODICI

Attesting Officer        Acting Director of the United States Patent and Trademark Office